United States Patent [19]

Choi

[11] Patent Number: 5,535,070
[45] Date of Patent: Jul. 9, 1996

[54] MAGNETIC RECORDING/REPRODUCING APPARATUS INCLUDING WINDBREAK MEMBERS FOR PREVENTING AIR FLOW BETWEEN HEAD DRUM AND TAPE

[75] Inventor: Jin-seung Choi, Suwon, Rep. of Korea

[73] Assignee: Samsung Electronics Co., Ltd., Kyungki-do, Rep. of Korea

[21] Appl. No.: 428,847

[22] Filed: Apr. 25, 1995

Related U.S. Application Data

[63] Continuation of Ser. No. 102,068, Aug. 4, 1993, abandoned.

[30] Foreign Application Priority Data

Oct. 6, 1992 [KR] Rep. of Korea .................. 92-19060

[51] Int. Cl.⁶ .................................................. G11B 15/61
[52] U.S. Cl. .................................. 360/84; 360/130.24
[58] Field of Search ................... 360/130.24, 130.23, 360/130.22, 8, 84; 242/358

[56] References Cited

U.S. PATENT DOCUMENTS 4,964,002  10/1990  Nakamichi ........................ 360/130.23

FOREIGN PATENT DOCUMENTS

| 52-23908 | 2/1977 | Japan | 360/130.24 |
| 62-291744 | 12/1987 | Japan | 360/130.24 |
| 01-106354 | 4/1989 | Japan | 360/130.24 |
| 01-119948 | 5/1989 | Japan | 360/130.24 |
| 01-154346 | 6/1989 | Japan | 360/130.24 |
| 04-44614 | 2/1992 | Japan | 360/130.24 |
| 04-252412 | 9/1992 | Japan | 360/130.24 |

*Primary Examiner*—Stuart S. Levy
*Assistant Examiner*—Kevin M. Watkins
*Attorney, Agent, or Firm*—Sughrue, Mion, Zinn, Macpeak & Seas

[57] ABSTRACT

A magnetic recording/reproducing apparatus comprises windbreak members between a rotary head drum and a guide mechanism so as to prevent airflow between the head drum and the tape. Such a magnetic recording/reproducing apparatus significantly reduces the rising of the magnetic tape from the outer circumferential surface of the rotary head drum, to enable the tape's close contact with the head drum. Also, tape oscillation and subsequent signal jitter is reduced to enhance high-density and highly accurate magnetic recording and reproduction.

1 Claim, 2 Drawing Sheets

MAGNETIC RECORDING/REPRODUCING APPARATUS INCLUDING WINDBREAK MEMBERS FOR PREVENTING AIR FLOW BETWEEN HEAD DRUM AND TAPE

This is a continuation of application Ser. No. 08/102,068 filed Aug. 4, 1993, now abandoned.

BACKGROUND OF THE INVENTION

The present invention relates to a magnetic recording/reproducing apparatus, and in more detail, to a magnetic recording/reproducing apparatus whose structure is improved so as to prevent the generated airflow due to the running of a magnetic tape and rotation of a rotary head drum from passing between the rotary head drum and the magnetic tape, which magnetic tape travels in close contact with the rotary head drum.

Generally, in the magnetic recording/reproducing apparatus of a rotary head system, a rotary head drum 1 comprises a rotary drum 2 on which magnetic heads 4 and 4' are installed and a fixed drum 3 which is fixedly installed in the same axis with the rotary drum, as illustrated in FIG. 1. Also, flanking the rotary head drum, guiding rollers 5 and 5' which draw out a magnetic tape 6 from a tape cassette (not shown) are movably installed.

When the tape cassette is loaded in the magnetic recording/reproducing apparatus, magnetic tape 6 is drawn out from the tape cassette by guiding rollers 5 and 5', so as to be loaded toward rotary head drum 1. As described above, magnetic tape 6 is caused to travel by the pressure of a pinch-roller and a capstan motor axis (not shown) while in close contact with rotary head drum 1. Simultaneously, rotary head drum 1 is rotated at a constant speed with respect to the running speed of magnetic tape 6. At this time, magnetic heads 4 and 4' helically scan magnetic tape 6 so as to record or reproduce information.

Meanwhile, in such a magnetic recording/reproducing apparatus of the rotary head system, since magnetic tape 6 has a large relative velocity to rotary drum 2 to accomplish recording and reproduction of high-density and high-accuracy, air turbulence is generated in the proximity of magnetic tape 6 and rotary drum 2 by the relative movement therebetween. Accordingly, as indicated by the dotted arrows of FIG. 2, air flows between magnetic tape 6 and rotary head drum 1. It should be noted that proper airflow facilitates tape travel and extends the life of the magnetic tape and magnetic heads. Meanwhile, if an overabundance of the above-described airflow is present by the high-speed running of magnetic tape 6 and high-speed rotation of rotary drum 2, the tape is lifted from the outer circumferential surface of rotary head drum 1 such that an oscillation in the tape is created, which increases tape jitter and in turn lowers the picture quality as output to a display screen.

More particularly, as the relative speed of magnetic tape 6 with respect to rotary drum 2 increases, the degree of lifting of the tape from the outer circumferential surface of rotary head drum 1 also increases. Accordingly, the reproduced signal quality is diminished further.

SUMMARY OF THE INVENTION

To solve the above-described problems, it is an object of the present invention to provide a magnetic recording/reproducing apparatus whose structure is improved so as to prevent the generation of an excessive flow of air, even though a magnetic tape runs at a high speed and a rotary drum rotates at a high speed, thereby reducing the loss of an output signal.

To accomplish the object, the present invention provides a magnetic recording/reproducing apparatus having a guide mechanism for guiding the run of a magnetic tape and loading the magnetic tape onto the rotary head drum, which comprises windbreak members for preventing the flow of air between the head drum and magnetic tape, which are respectively provided between the head drum and the guide mechanism.

According to a characteristic of the present invention, the windbreak members can prevent airflow, generated in accordance with the direction of the high-speed running of the magnetic tape and the high-speed rotation of the rotary head drum, from flowing between the rotatory head drum and magnetic tape.

BRIEF DESCRIPTION OF THE DRAWINGS

Further features and advantages will become more apparent from the following and more particular description of the preferred embodiment of the invention as illustrated in the accompanying drawings and in which.

DETAILED DESCRIPTION OF THE INVENTION

Figure 1:
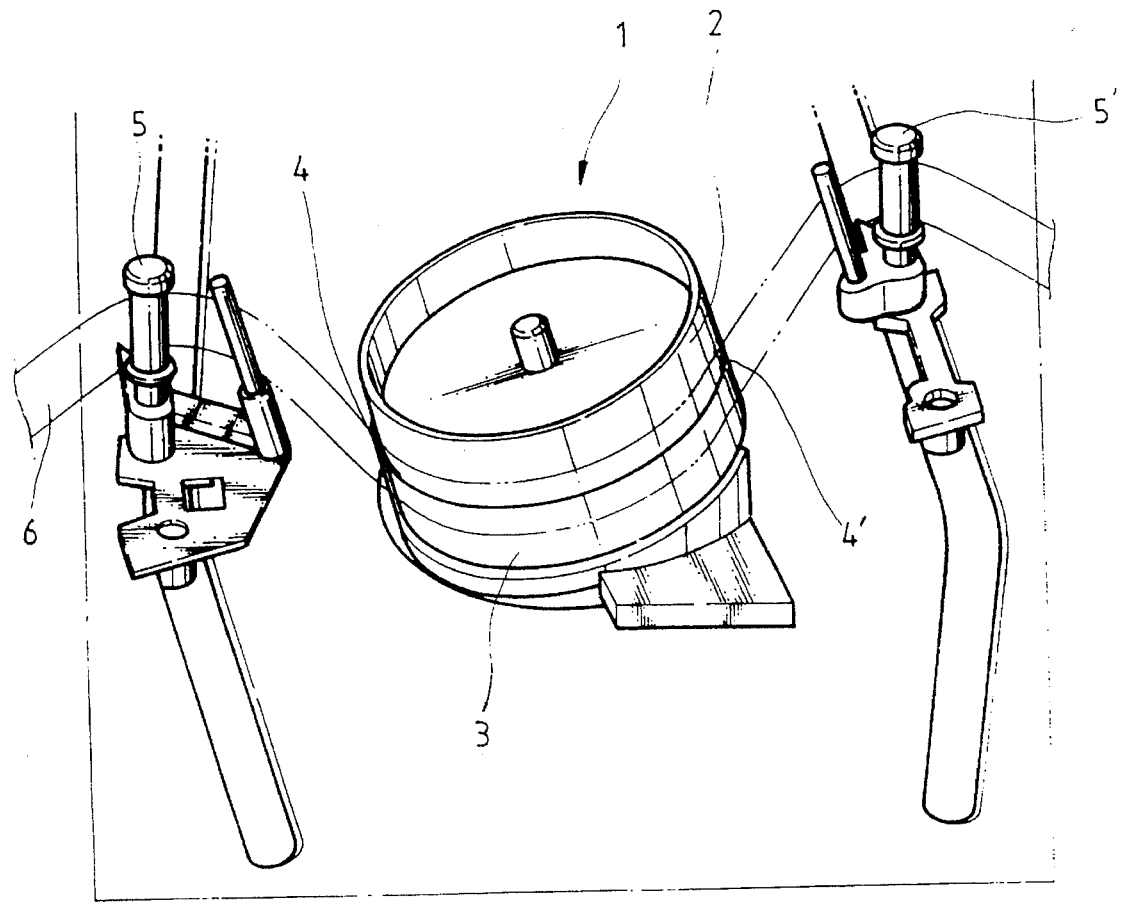
FIG. 1 is a schematic view of a conventional magnetic recording/reproducing apparatus.
Figure 2:
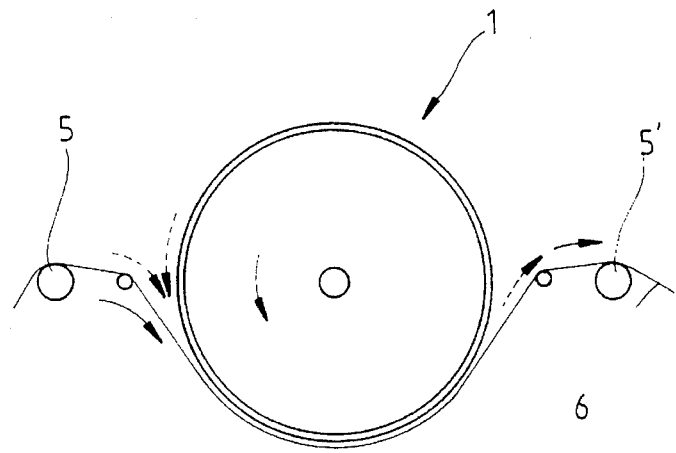
FIG. 2 is a schematic plan view of the apparatus shown in FIG. 1.
Figure 3:
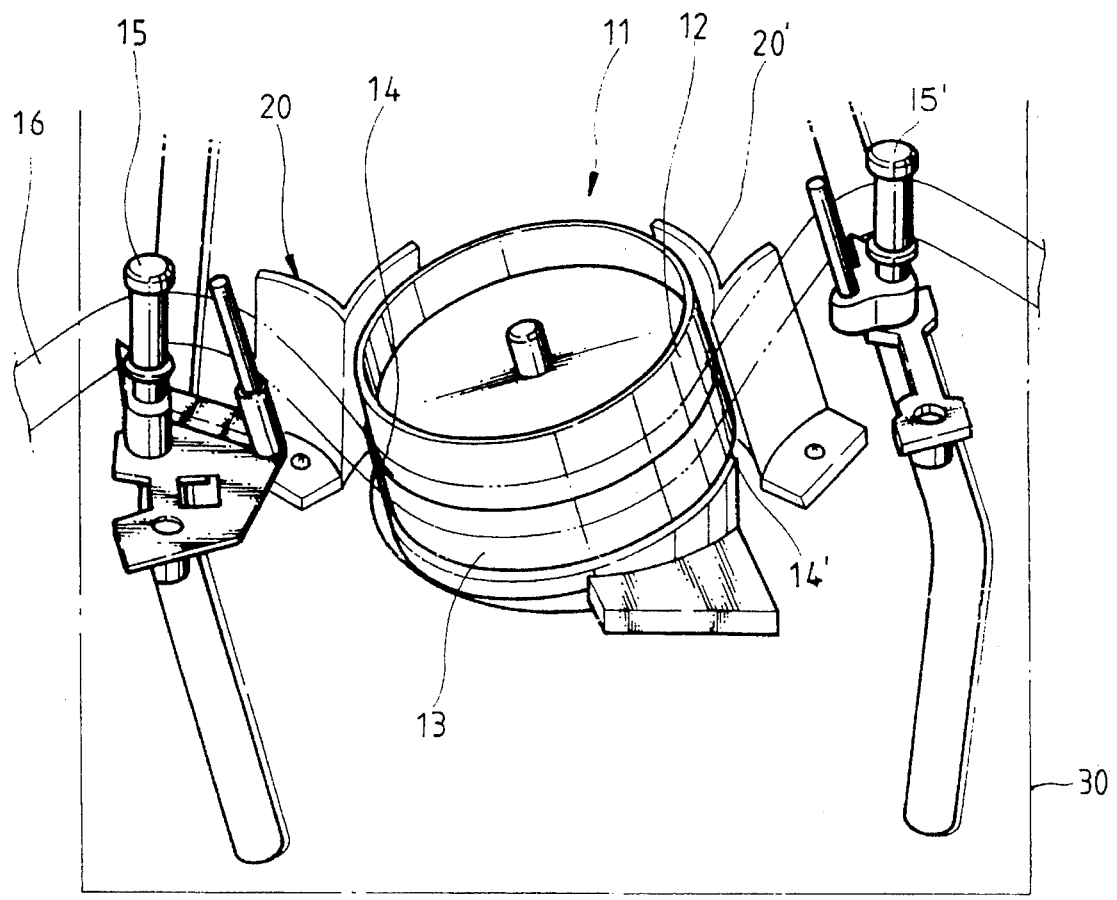
FIG. 3 is a schematic view of a magnetic recording/reproducing apparatus according to the present invention.

A magnetic recording/reproducing apparatus according to the present invention is schematically illustrated in FIG. 3. Here, a rotary head drum 11 comprising a rotary drum 12 on which magnetic heads 14 and 14' are installed, and a fixed drum 13 rotating on the same axis with the rotary drum is installed on a deck 30. Also, guiding rollers 15 and 15' are installed as a guide mechanism which draws out a magnetic tape 16 from a tape cassette (not shown) and loads the drawn tape so as to be in close contact with the outer circumferential surface of rotary head drum 11.

Figure 4:
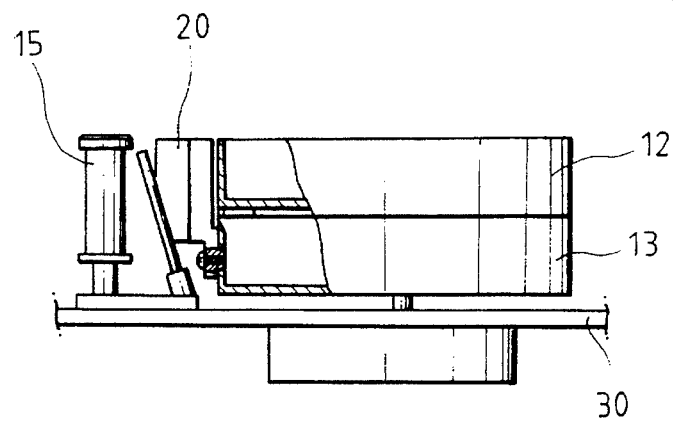
FIG. 4 is a front view of the magnetic recording/reproducing apparatus according to one embodiment of the present invention.

Shown in FIG. 3 as a characteristic feature of the present invention, windbreak members 20 and 20' are fixedly installed on deck 30 (FIG. 4) at both branching points between magnetic tape 16 and rotary head drum 11. Each of windbreak members 20 and 20' is formed in a substantial V shape as shown in FIG. 3. One side surface of each windbreak member is formed to a circumferential surface having the same curvature as that of rotatory head drum 11. The other side surfaces are formed so as to be coincident with a plane parallel to the travel path of magnetic tape 16. The windbreak members 20 and 20' are fixed on the deck 30 as shown in FIG. 3. Meanwhile, windbreak members 20 and 20' can be installed on fixed drum 13 of rotary head drum 11 as shown in FIG. 4.

The magnetic recording/reproducing apparatus according to the present invention having such a structure operates as follows. Magnetic tape 16 is drawn out from the tape cassette (not shown) by guiding rollers 15 and 15' so as to be loaded onto rotary head drum 11. Magnetic tape 16 is caused to travel by the pressure between an axis of a capstan motor and a pinch roller (not shown). Also, rotary drum 12 is properly rotated at a relative speed with respect to the running speed of magnetic tape 16, while the magnetic tape is in close contact with rotary head drum 11 as described above.

Here, magnetic heads 14 and 14' helically scan information recorded on magnetic tape 16 so as to reproduce or record information thereon. When information is recorded and/or reproduced on a magnetic tape as described above such that a flow of air is generated by the high-speed running of magnetic tape 16 and the high-speed rotation of rotary drum 12, in accordance with the direction of the tape travel and drum rotation, the air flows between rotary head drum 11 and magnetic tape 16 which desirably travels in close contact with the rotary head drum. However, this airflow is intercepted by windbreak members 20 and 20' and thus prevented.

Accordingly, the magnetic recording/reproducing apparatus of the present invention significantly reduces the lifting of magnetic tape 16 from the outer circumferential surface of rotary head drum 11, thereby improving the adherence of the tape to the drum. Also, the oscillation of the tape and subsequent signal jitter is greatly reduced.

As described above, the present invention is an effective invention providing a magnetic recording/reproducing apparatus which enhances high-density and highly accurate magnetic recording and reproduction.

Having described a preferred embodiment of the present invention, it will be clear to those skilled in the art that modifications and alternatives to the disclosed apparatus exist within the scope and spirit of the present invention. Accordingly, it is intended to limit the scope of the present invention only as indicated in the following claims.

What is claimed is:

1. A magnetic recording/reproducing apparatus having a guide mechanism which includes first and second guide rollers respectively positioned on opposite sides of a rotary head drum when said guide mechanism is in a tape loading position for guiding the run of a magnetic tape and loading said magnetic tape onto said rotary head drum comprising a rotary drum and a fixed drum, and first and second windbreak members for preventing the flow of air, due to the running of said magnetic tape and rotation of said rotary drum, from passing between said rotary head drum and said magnetic tape, wherein said first and second windbreak members are installed on the fixed drum of said rotary head drum and each of said windbreak members is formed in an open, hollow V shape which extends upwardly from said fixed drum such that one arm of the V shape has a curvature equal to that of said rotary head drum and is positioned proximate to said rotary drum but in a non-contacting relationship thereto, while the other arm of the V shape protrudes outwardly away from said rotary drum toward a corresponding one of said first and second guide rollers, when said guide mechanism is in the tape loading position, and is parallel to the travel path of said magnetic tape, wherein airflow between said rotary head drum and said magnetic tape is intercepted and prevented by said first and second windbreak members.

* * * * *